US008109431B2

(12) United States Patent
Garry et al.

(10) Patent No.: US 8,109,431 B2
(45) Date of Patent: Feb. 7, 2012

(54) METHOD OF JOINING ARTICLES USING ADJUSTMENT FEATURES

(75) Inventors: Ian M. Garry, Thurcaston (GB);
Michael N. Wybrow, Nottingham (GB)

(73) Assignee: Rolls-Royce PLC, London (GB)

( * ) Notice: Subject to any disclaimer, the term of this patent is extended or adjusted under 35 U.S.C. 154(b) by 158 days.

(21) Appl. No.: 12/458,544

(22) Filed: Jul. 15, 2009

(65) Prior Publication Data
US 2010/0050410 A1   Mar. 4, 2010

(30) Foreign Application Priority Data

Sep. 2, 2008   (GB) .................................. 0815879.2

(51) Int. Cl.
*B23K 31/02*   (2006.01)
(52) U.S. Cl. .................. 228/159; 228/160; 228/170
(58) Field of Classification Search ....... 228/141.1–174, 228/17.5; 29/445, 525.14, 423
See application file for complete search history.

(56) References Cited

U.S. PATENT DOCUMENTS

| 1,860,683 | A | * | 5/1932 | Meinel | 228/160 |
| 3,002,265 | A | * | 10/1961 | Stalker | 29/889.72 |
| 3,298,587 | A | * | 1/1967 | Seeloff et al. | 228/5.7 |
| 3,365,775 | A | * | 1/1968 | Cavagnero et al. | 29/898.067 |
| 4,500,030 | A | * | 2/1985 | Gerber et al. | 228/125 |
| 4,857,027 | A | * | 8/1989 | Makita et al. | 445/37 |
| 5,494,209 | A | * | 2/1996 | Randlett et al. | 228/147 |
| 5,618,453 | A | * | 4/1997 | La Rocca | 219/121.63 |
| 5,815,904 | A | * | 10/1998 | Clubb et al. | 29/418 |
| 6,509,541 | B2 | * | 1/2003 | Jung et al. | 219/91.2 |
| 6,539,631 | B1 | * | 4/2003 | McWilliams | 29/897.2 |

FOREIGN PATENT DOCUMENTS

| GB | 2 342 608 A | 4/2000 |
| WO | WO 98/12437 A1 | 3/1998 |
| WO | WO 00/04295 A1 | 1/2000 |

* cited by examiner

*Primary Examiner* — Kiley Stoner
*Assistant Examiner* — Carlos Gamino
(74) *Attorney, Agent, or Firm* — Oliff & Berridge, PLC

(57) ABSTRACT

A method of joining a first article to a second article using adjustment features located in an assigned scrap portion of the first article. The first article can be a casing for a turbine engine the first article being the casing skin and the second article a flange. The adjustment features are springs that can be stretched to increase the circumference of the skin. Following the correct sizing of the skin and joining to the flange the attachment features are removed along with the assigned scrap portion of the skin.

12 Claims, 4 Drawing Sheets

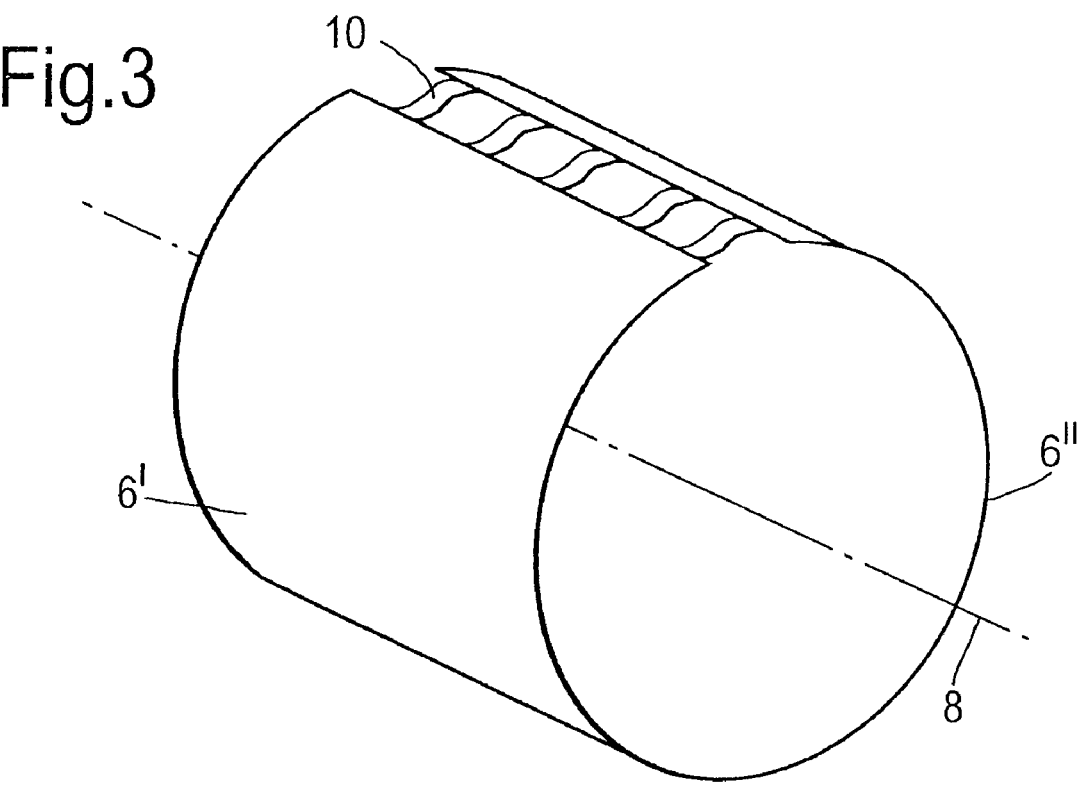
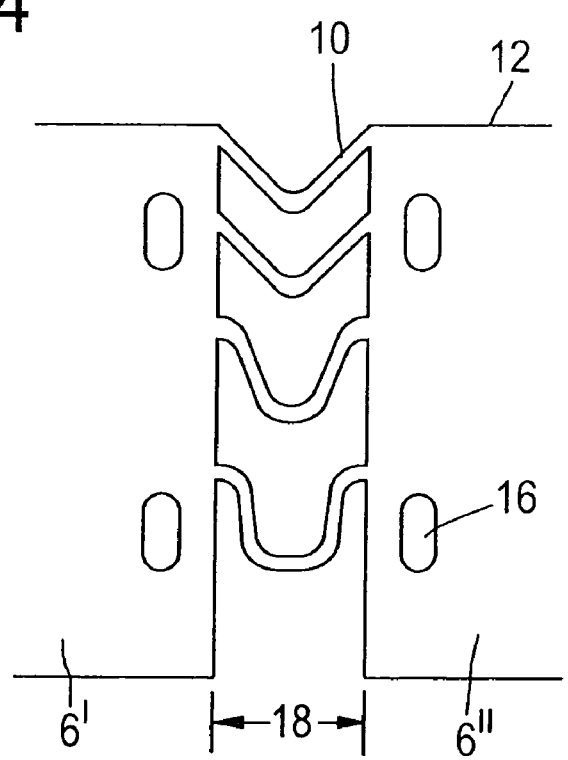

METHOD OF JOINING ARTICLES USING ADJUSTMENT FEATURES

SUMMARY OF INVENTION

This invention relates to a method of joining a first article to a second article. It finds particular application where at least one of the articles is formed from a large sheet and the join has a complex join profile.

It is an object of the present invention to provide an improved method of joining a first article to a second article.

According to a first aspect of the invention there is provided a method of joining a first article to a second article, the first article having an assigned scrap portion and adjustment features located in the assigned scrap portion for adjusting dimensions of the first article; the method having the steps of presenting the first article to the second article, adjusting the dimensions of the first article using the adjustment means, joining the first article to the second article and removing the scrap portion.

Preferably the method includes the step of forming the first article from a sheet or sheets of material curved into a cylindrical or conical form. The first article may also be provided by a machined forging or casting.

Preferably the step of forming the first article includes welding the sheet or sheets to secure the first article in its cylindrical or conical form.

Preferably the method further comprises the step of defining the adjustment features in the first component.

The adjustment features may be defined by mechanical, laser or water cutting of the first article.

The attachment features may be defined along a weld join.

Preferably the method further comprises the step of applying a removable adjustment tool to the first article, the adjustment tool being operable to change the length of the adjustment features.

The step of joining the first article to the second article may comprise welding.

The step of removing the scrap portion may comprise mechanical, laser or water cutting of the first article.

Preferably the method further comprises the step of joining the first article to a third article along an edge formed when the scrap portion is removed.

According to a second aspect of the invention there is provided a casing for a turbine engine comprising a skin joined to a flange according to a method defined in any one of the preceding claims.

BRIEF DESCRIPTION OF DRAWINGS

Embodiments of the invention will now be described by way of example only, with reference to the accompanying drawings, in which:

FIG. 3 depicts a cylinder formed from the blank of FIG. 2;

FIG. 4 shows a closer view of the adjustment features of the blank of FIG. 2;

DESCRIPTION OF EMBODIMENTS

Figure 1:
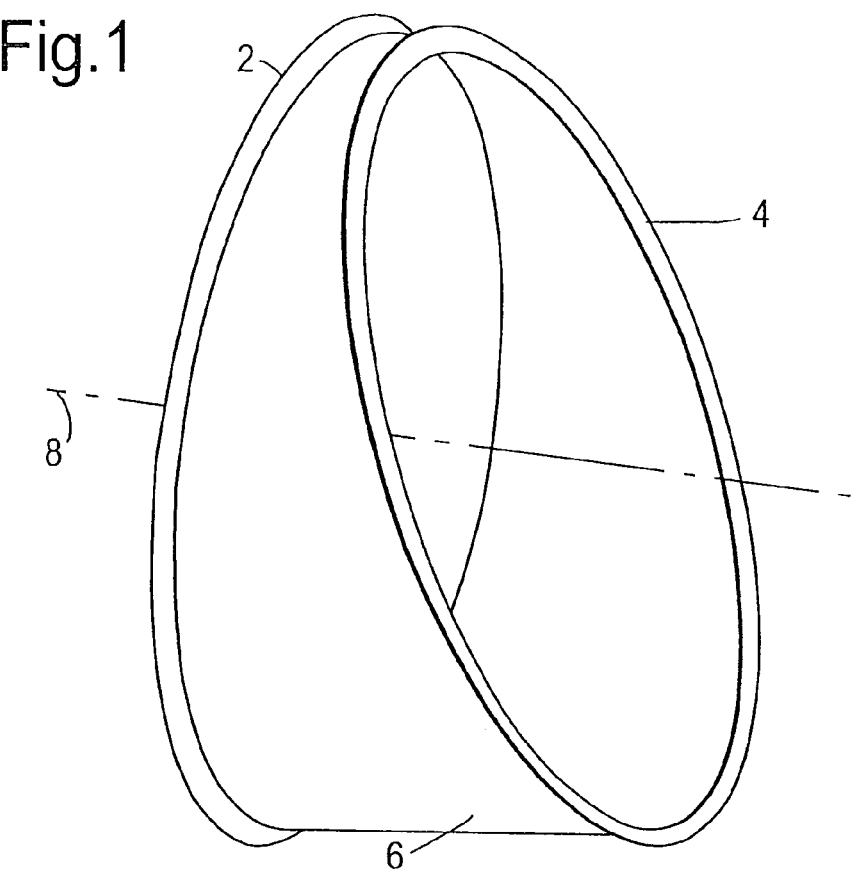
FIG. 1 depicts a cylindrical casing having an inlet plane and an outlet plane arranged at a different angle to the inlet plane.

FIG. 1 depicts a simple cylindrical casing formed in accordance with the invention. The nozzle comprises a first flange 2, a second flange 4 and a side wall 6 connecting the two flanges.

The first flange 2 extends about an axis 8 and in this first embodiment the side wall or skin 6 extends about this axis at a constant radius. This is a simpler embodiment to manufacture than some embodiments of the invention where the skin is conical i.e. the radius of the skin from the axis increases or decreases as the distance along the axis from the plane of the first flange 2 increases.

The skin 6 is formed and welded to the first flange 2 before undergoing a machining step to form a second face to which the second flange 4 is secured. In some aircraft casings the flange 2 has a circumferential length of around 1 meter or more, with some being 2, 3 or 4 or more meters in length.

With the size and tight tolerances demanded of these components it is exceptionally difficult to manufacture. Each of the components: flange, skin and flange have a manufacturing tolerance as does the joining method used, which is typically electron beam welding though other appropriate joining methods may be used.

To facilitate manufacture the skin 6 is provided with adjustment features, for example, springs 10, to simplify the alignment of a first edge 12 with the first flange 2. Although this edge 12 is shown as being straight to align to the circular flange 2 it is possible to give it a profile to enable the edge, when the skin is formed into a cylinder, to be joined directly to the outside of another cylindrical component such as an engine casing for example.

Figure 2:
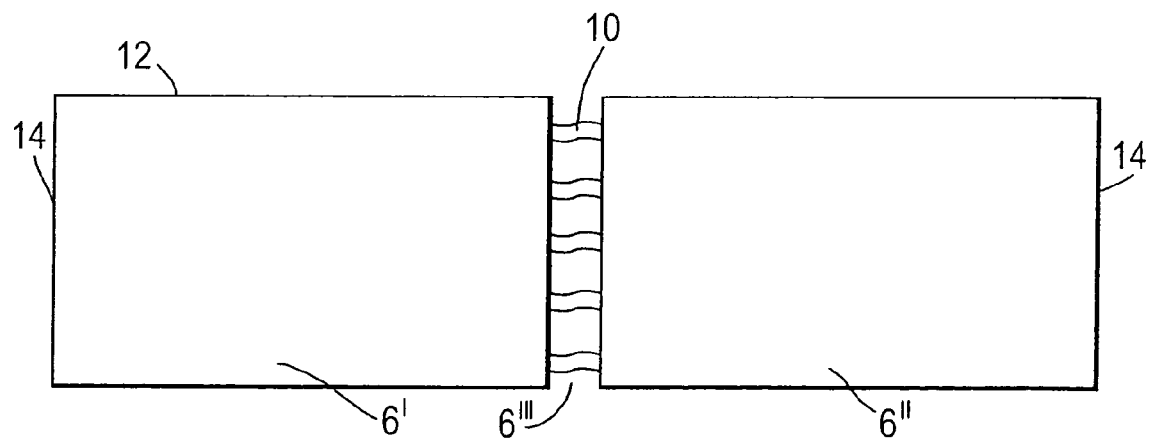
FIG. 2 depicts a sheet metal blank that may be used to form the cylindrical casing of FIG. 1.

The skin 6 may be formed from a single sheet of metal as shown in FIG. 2. The sheet has a length that is slightly greater than the diameter of the flange 2 and is bent such that the ends 14 contact one another and are welded together to form a cylinder. In the region 6''' a series of springs 10 are subsequently produced by machining the cylinder. The springs can be formed using any appropriate machining technique e.g. stamping, laser cutting, water-jet cutting or other similar process.

The sprung region 6''' is, in this figure, shown to be midway round the cylinder from the weld join along edges 14 but this need not be the case and in some embodiments it may be preferable, possibly for stress reasons, to locate the sprung region further round the circumference.

In an alternative manufacturing approach the skin portions 6, 6'' are originally manufactured separately and welded together along their two opposing edges to form the cylinder. The spring features are preferably formed along one of the weld lines. The finished cylinder is depicted in FIG. 3.

As shown in FIG. 4, the skins 6', 6'' are provided with apertures 16 which permit connection of a tool that can adjust the width of the gap 18 either inwards or outwards.

The surface 12 of the cylinder is presented to the first flange 2 and the circumference length adjusted till it is the correct size for the flange. Once they match the cylinder is welded to the flange. Where a cylindrical skin is desired the width of gap 18 is typically constant along the length of the cylinder. Where the skin is intended to taper either towards or away from the axis 8 it is usual to require the adjustment of the width of the gap to be different along the length of the column.

The taper or splay angle of the skin is primarily determined by the profile of the edge 12 presented to the flange 2. If, in its blank form, the edge is concave then generally the skin will splay; if the edge is convex then generally the skin will taper. The desired profile of edge 12 is calculated through modeling or measured from an empirical model.

Figure 5:
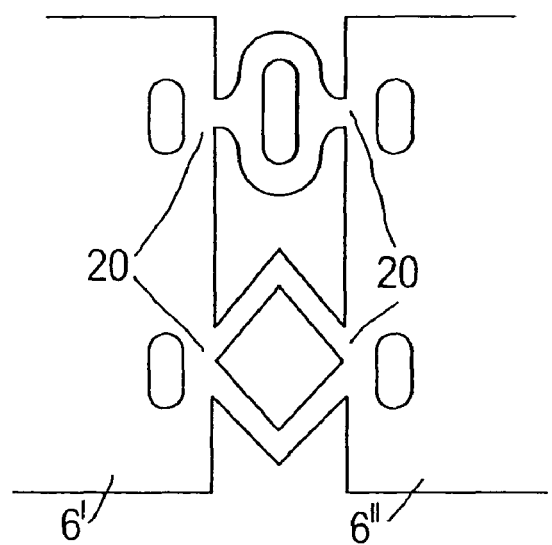
FIG. 5 and FIG. 6 show alternative adjustment features.
Figure 6:
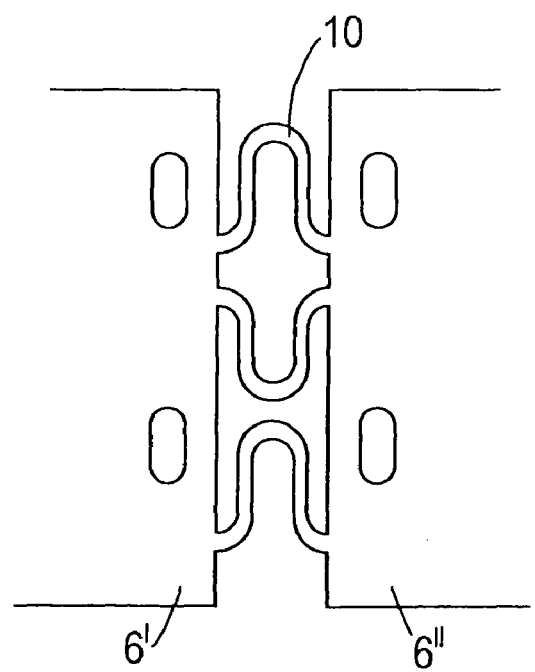

Different spring types and arrangements may be used as shown in FIGS. 4 to 6. In FIG. 4 the springs 10 are curved ligaments that have different lengths the further from the edge 12 each ligament is. The increased lengths permit greater or lesser travel which can help to achieve the correct skin profile.

The apertures 16 are arranged in pairs and the spacing of each pair can be controlled by the adjustment tool till the correct profile is met. Depending on the requirements, the pair spacings may be controlled individually or en masse. The springs retain the conical or cylindrical shape of the skin yet permit the required adjustment in circumferential length which would be impeded if the skin were uniform over the whole of its circumference.

In FIG. 5 the springs, two alternatives are shown, have a single connection point 20 to each panel portion 6', 6" and a branched ligature extending between the connection points. By using the branched springs it is possible to reduce any axial twist of the cylinder or cone that is generated as the circumferential length of the skin is adjusted, or by the natural spring of the skin 6.

In FIG. 6, again the springs are curved ligaments but, when compared with FIG. 4, the curve direction alternates. The alternating curve direction also helps to reduce axial twist. It will be appreciated that any appropriate form of spring may be used.

Figure 7A:
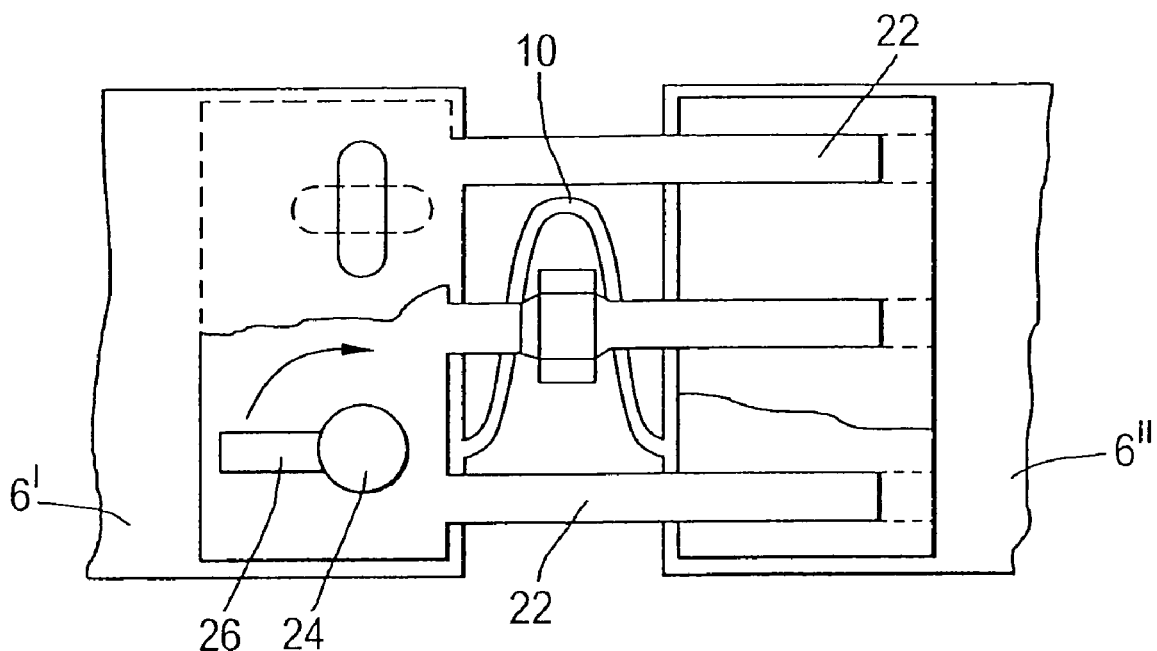
FIG. 7A and FIG. 7B show two views of an exemplary tool used to adjust the adjustment features.
Figure 7B:
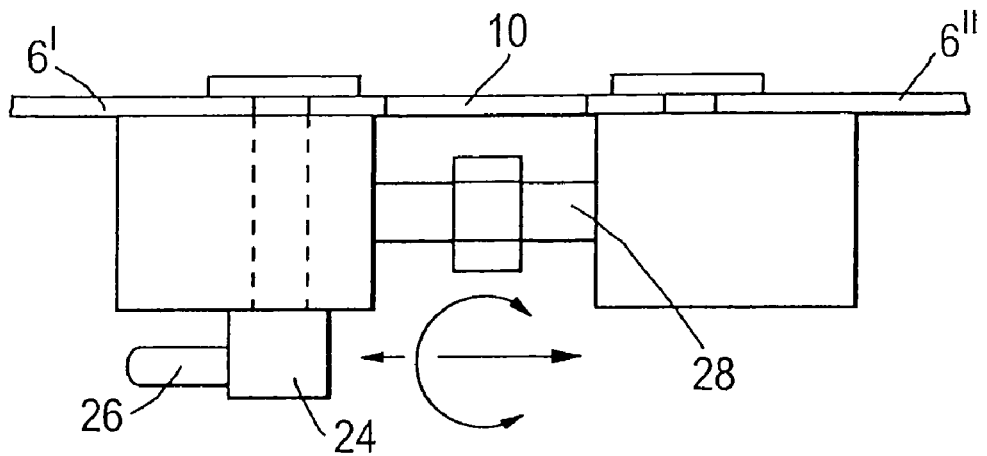

FIGS. 7A and 7B respectively depict two views of an exemplary tool for expanding or contracting the gap between the edges of the skin. The tool comprises a clamp with a captive nut.

The tool comprises a first attachment feature attached to skin portion 6' and a second attachment feature attached to skin portion 6". Both attachment features are secured to their respective skin by bolts 24. The bolts 24 are equipped with a lever 26 that allows the bolts to be rotated to lock the attachment features into place. For clarity, only one bolt 24 is shown in the views of the tool in FIGS. 7A and 7B.

The attachment features are secured together by a threaded bolt 28 and two guide bars 22. The guide bars are arranged to slide within slots and serve to aid prevention of twisting of the skins.

Movement of the two attachment features and hence the two skins relative to each other is achieved by a threaded bolt 28 attached to a nut such that rotation of the nut causes rotation of the threaded bolt and a corresponding translational movement of the attachment features.

Once the circumferential length of the skin has been increased or decreased to match the size of the first flange 2 the skin can be welded to it. If it is necessary to alter the taper or splay angle of the skin it is better to do this before the skin is welded to the flange, however it is possible to make fine adjustments following attachment.

The skin is trimmed to the correct angle and diameter ready for attaching to the second flange 4. The trimming is preferably performed using a $CO_2$ laser or other such machine, but mechanical cutting may also be used. The angle of cut is such that the springs are located in a scrap portion which once removed is recycled for further use. Beneficially, the removal means that any damage caused by the forming of the springs or the weld line along which they are formed is removed from the final component. This permits a wider selection of adjustment means to be used to change dimensions of the article. Depending on the finished article it is possible to adjust the length of the article by 30 or more millimeters.

The second flange 4 is then welded to the skin using an electron beam welding procedure.

It will be appreciated that the invention utilises a portion of an article to manage the weld join alignment. The portion of the article having the adjustment features is removed from the finished article. The invention advantageously allows the article, which may be conical, to be adjusted to fit a second article and enables the joint to achieve what are often tight tolerances demanded in the aerospace industry.

The invention provides a simple and reliable solution to a very difficult manufacturing problem by providing an adjustable fit for a skin to flange weld where both parts can have 3 dimensional curvatures. The method of the invention permits the accommodation of manufacturing variations to facilitate conformance and right-first-time production.

The invention claimed is:

1. A method of joining a first article to a second article, the first article including an assigned scrap portion having openings and adjustment features located in the assigned scrap portion for adjusting dimensions of the first article, the method comprising:
   presenting the first article to the second article,
   adjusting the dimensions of the first article using the adjustment features, and
   joining the first article to the second article and removing the scrap portion, wherein the adjustment features are defined by the openings in the assigned scrap portion.

2. The method of claim 1, further comprising the step of forming the first article from a sheet or sheets of material curved into a cylindrical or conical form.

3. The method of claim 2, wherein the step of forming the first article includes welding the sheet or sheets to secure the first article in its cylindrical or conical form.

4. The method of claim 1, wherein the method further comprises the step of defining the adjustment features in the first component.

5. The method of claim 4, wherein the adjustment features are defined by mechanical, laser or water cutting of the first article.

6. The method of claim 5, wherein the adjustment features are defined along a weld joint.

7. The method of claim 1, further comprising the step of applying a removable adjustment tool to the first article, the adjustment tool being operable to change the length of the adjustment features.

8. The method of claim 1, wherein the step of joining the first article to the second article comprises welding.

9. The method of claim 1, wherein the step of removing the scrap portion comprises mechanical, laser or water cutting of the first article.

10. The method of claim 1, the method further comprising the step of joining the first article to a third article along an edge formed when the scrap portion is removed.

11. A method of welding a cylindrical or conical article to a second article, the cylindrical or conical article including an assigned scrap portion and adjustment features located in the assigned scrap portion for adjusting the dimensions of the cylinder, the method comprising:
   presenting the cylinder or cone to the second article,
   adjusting the diameter of the cylinder or cone using the adjustment features, and
   welding the cylinder or cone to the second article and removing the scrap portion.

12. The method according to claim 11, wherein the second article has a curved face, and the cylindrical or conical article is welded to the curved face.

* * * * *